July 2, 1940.　　　F. A. DONALDSON　　　2,206,718
BACKFIRE OIL TRAP FOR AIR CLEANERS
Filed Jan. 16, 1939

Inventor
Frank A. Donaldson
By his Attorneys

Patented July 2, 1940

2,206,718

UNITED STATES PATENT OFFICE 2,206,718

BACKFIRE OIL TRAP FOR AIR CLEANERS

Frank A. Donaldson, St. Paul, Minn.

Application January 16, 1939, Serial No. 251,142

1 Claim. (Cl. 183—15)

This invention relates to air cleaners for use in connection with internal combustion engines and of that type of air cleaner embodying a body of fluid, usually oil, and more particularly the invention relates to a novel manner of forming backfire oil traps in the intakes of such air cleaners.

It is a well recognized fact that in air cleaners of the type wherein a body of fluid such as oil is employed as a dust collecting medium, there is a tendency under occasional conditions of backfiring of the engine through its intake to blow the oil from the well out through the intake conduit or passage of the air cleaner. Not only is such discharging of oil by backfire very objectionable because it often results in reduced cleaning efficiency of the air cleaner, due to the lowering of the oil level therein, but is further objectionable because such oil as is discharged under conditions of backfire is often blown over the surface of machinery, buildings and operators.

My present invention provides, at a minimum of cost and in a minimum of space, a highly efficient arrangement whereby dust collecting fluid displaced from the oil well and directed backwardly through the cleaner toward atmosphere, under instantaneous back pressure surges produced by backfiring of an engine, will be thrown out of the backwardly directed air stream in the air cleaner's intake passage and will be trapped therein until the pressure surge occasioned by the backfire has passed, after which, the fluid is permitted to drain back by gravity into the well of the cleaner. Although the present backfire trap is applicable to various different types of fluid containing air cleaners, it has been primarily designed for use in connection with air cleaners of the general character disclosed in the patent to Lowther No. 2,069,889 of Feb. 9, 1937, and is herein illustrated in connection with an air cleaner of this general character.

The above and other important objects and advantages of the invention will be made apparent from the following specification, claim and drawing.

In the accompanying drawing, like characters indicate like parts throughout the several views.

Referring to the drawing.

Figure 1:
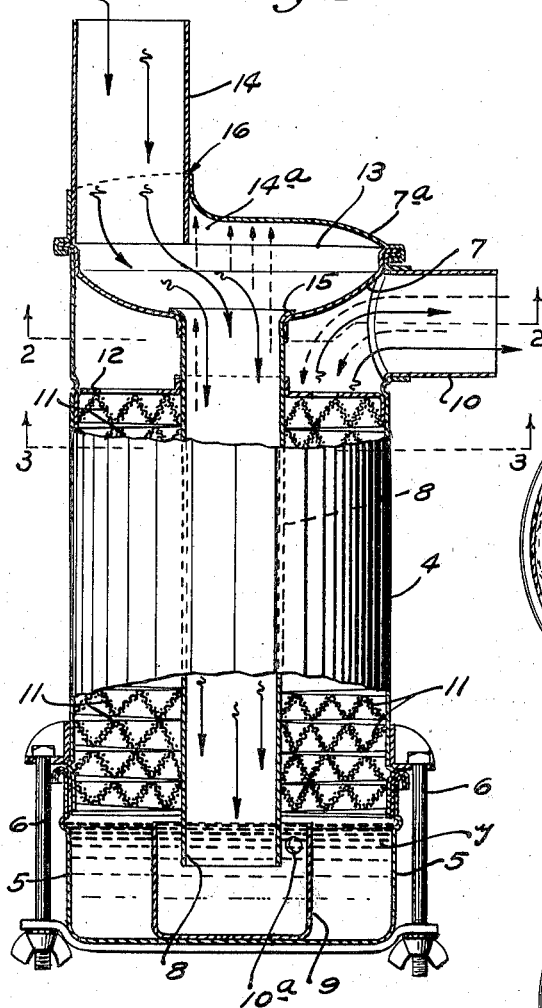
Fig. 1 is a view in side elevation, with some parts broken away and shown in axial section, of an air cleaner incorporating the preferred form of the invention.
Figure 2:
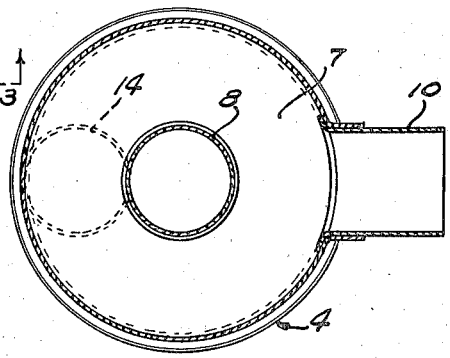
Fig. 2 is a transverse sectional view taken on the line 2—2 of Fig. 1.
Figure 3:
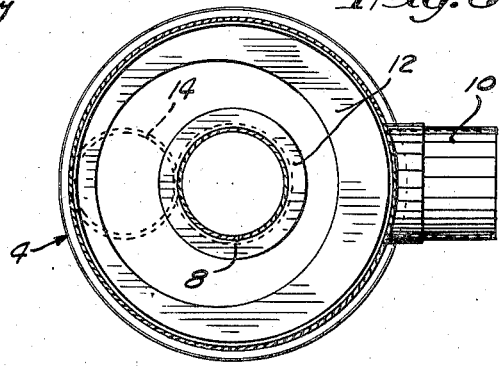
Fig. 3 is a transverse sectional view taken on the line 3—3 of Fig. 1 and looking upward.

The air cleaner illustrated includes a cylindrical shell or casing 4 that is primarily open at its lower end, but which is normally closed by an oil cup 5 that is telescopically applied thereto and removably held in place by means including wing-nut equipped bolts 6. The head end of the cylindrical casing 4 is primarily closed by a concave head member 7. Opening axially through the concave head member 7 and leading downwardly into the oil well to a point below the static fluid level therein is an air intake conduit section 8. Surrounding the lower end of the intake conduit section 8 and spaced both axially and radially from the discharge end thereof and spaced radially from the sides of the oil well is an oil cup 9 having suitable metering openings 10ª. Opening radially form the upper extreme portion of the casing 4 is an air outlet duct section 10 that is adapted to be connected to the air intake of an internal combustion engine in the conventional manner. Interposed in the annular space within the casing 4 surrounding the intake tube 8 and extending axially thereof between the vicinity of the oil well and the vicinity of the air outlet 10, is a suitable oil and dust intercepting means, which, in the particular form illustrated, is in the form of a series of corrugated annular screens 11 of the nature disclosed and broadly claimed in the Schulz Patent No. 2,011,213 of August 13, 1935. Applied over the screens 11 is an air flow equalizing baffle plate 12 of the type disclosed and claimed in the Lowther Patent No. 2,006,927 of July 2, 1935.

The backfire oil trap, in its preferred form illustrated, is formed in part by the concave head member 7 and further includes a similar concave member 7ª, which is applied to the head end of the air cleaner body in reverse relation with respect to the head member 7 so as to form an expansion chamber 13 of much greater diameter than the intake conduit section 8, and in which oil may be trapped. Opening downwardly into the expansion chamber 13 through the head member 7ª is a primary intake conduit section 14, which latter conduit section is laterally or radially offset with respect to the axial conduit section 8 to such an extent that the interiors thereof are substantially out of axial alignment. In the arrangement just described, the conduit sections 8 and 14, which may be hereinafter referred to as small diameter sections, are axially spaced apart but are connected by the large diameter intake section formed by the head members 7 and 7ª. For the purpose of providing a suitable oil trapping baffle flange, the intake conduit section 14 is extended inwardly into the interior of the large diameter or expansion chamber 13 at 14ª.

The intake sections 8 and 14 open into the large diameter expansion chamber through suitable ports 15 and 16, respectively. Due to the convexity or outwardly bulging shape of the head section 7ª and the fact that the intake section 14 is tangential with the peripheral portion of the head section 7ª, the inner end 14ª of the conduit 14 projects inward of the head section 7ª to a maximum extent, at that circumferential portion thereof laterally most closely adjacent the conduit section 8.

Operation

When the apparatus described is coupled in the conventional manner to the intake of an internal combustion engine and the engine is operating normally, air will be drawn successively through the intake conduit sections 14, 13 and 8 and discharged downwardly against the body of oil in the oil well within the oil cup 9, and from thence will pass upwardly through the annular screen containing chamber surrounding the intake tube section 8 to and through the air cleaner's outlet section 10 to the engine. Under such normal operation, of course, oil y will be carried with the air stream from the well into the screen chamber, but such oil as is lifted into the screen chamber will be intercepted by the screens during its passage therethrough and removed from the upwardly moving air stream before reaching the outlet 10. Under such normal operation, the air passing downwardly through the enlarged diameter expansion chamber 13 between the axially spaced ends of the radially offset intake sections 14 and 8 merely makes a gentle curve within the chamber 13, as indicated by full line airflow indicating arrows in Fig. 1, so that the oil trap arrangement produces a very minimum of restriction to air flow in the intake.

When the engine backfires, the backfire explosion produces a momentary but quite high back pressure in the intake duct leading to the cleaner's outlet 10, as a result of which there is produced a rapid backward movement of air downwardly through the annular screen chamber. This downward movement of air, upon striking the oil in the well surrounding the intake conduit 8, causes oil to be displaced from the oil cup 9 and blown with great rapidity upwardly through the cleaner's axial intake conduit section 8 with air that is directed to atmosphere. The air thus shot backwardly through the air cleaner to atmosphere, under the instantaneous back pressure resulting from the backfire explosion, will follow the curved path indicated by full line arrows in Fig. 1, but in reverse direction, between the upper end of the intake section 8 and the axially spaced radially offset inner end of the intake section 14, but the oil thus shot upwardly through the intake section 8, at high velocity, will centrifugate out of the air stream as it makes its curve between axially spaced ends of the conduit sections 8 and 14 and will strike the upper head section 7ª approximately at its axial center, see dotted arrows in Fig. 1, and at a point radially outwardly offset from the inner baffle-acting end 14ª of the intake duct section 14. The oil thus impinged upon the upper head member 7ª will be spread out over the surface of said head member radially outwardly of the baffle-acting inner end 14ª of the conduit section 14 and will be trapped by the projecting baffle-acting portion 14ª against the passage into the conduit section 14 for the brief duration of the back surge pressure resulting from the backfire explosion. When this instantaneous back pressure has subsided, such oil as is trapped within the chamber 13 will readily drain back through the intake section 8 to the oil well.

The above described backfire trap has proven highly efficient in extensive commercial use under a wide variety of conditions, reduces to a very minimum the restriction to normal air flow set up by such devices, cannot become plugged up in operation, and can be provided at a very minimum cost over and above the cost of the air cleaner proper.

What I claim is:

In an air cleaner for an engine intake manifold including a casing having an oil reservoir, an air inlet conduit extending generally concentrically through said casing to said reservoir, and an air outlet leading from said reservoir, said inlet conduit comprising vertically spaced laterally offset sections and an intermediate unobstructed expansion chamber of materially greater diameter than said sections concentrically disposed within said casing and having upper and lower oppositely concaved walls, said conduit sections being of substantially uniform diameter with the outer section projecting a substantial distance through the upper curved wall of said chamber adjacent the periphery thereof and providing an oil intercepting skirt, said inner section depending coaxially from said chamber and out of register with said outer section, and the concaved lower wall of said chamber connecting said sections and forming a substantially unbroken continuation of one side wall of each section whereby an unobstructed gently curving inlet passageway is formed through said chamber providing the minimum of restriction to air flow in the intake during normal operation of the cleaner, said intercepting skirt obstructing back-flow of oil in the event of backfire.

FRANK A. DONALDSON.